Nov. 11, 1969  U. L. HART  3,478,097
POLYHALOGENATED SALICYLIDENE ANILINES
Filed April 29, 1966

INVENTOR
*UNA L. HART*
BY Thomas J. Nikolai
ATTORNEY 3,478,097
POLYHALOGENATED SALICYLIDENE ANILINES
Una L. Hart, St. Paul, Minn., assignor to Sperry Rand Corporation, New York, N.Y., a corporation of Delaware
Filed Apr. 29, 1966, Ser. No. 546,413
Int. Cl. C07c *119/10, 87/50*
U.S. Cl. 260—566                                14 Claims

ABSTRACT OF THE DISCLOSURE

The present invention relates to novel polyhalogenated salicylidene anilines having the structural formulae:

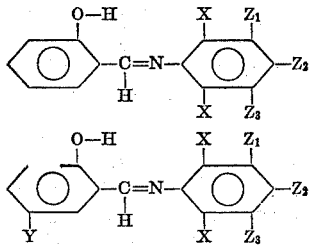

Figure 1:
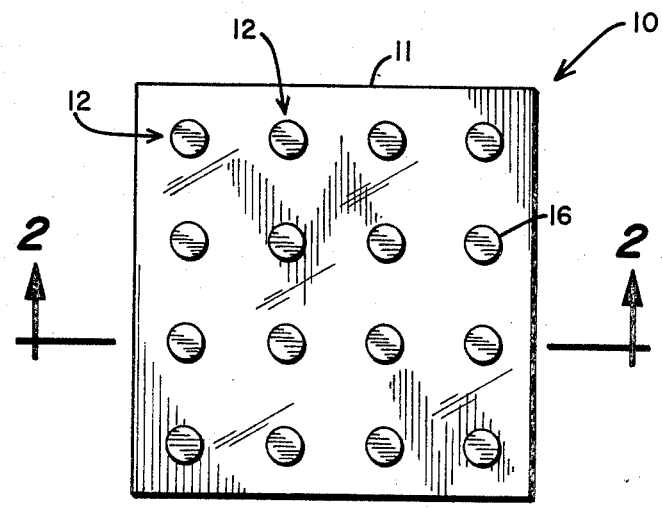

In these formulae X and Y represent one of the class consisting of the halogen atoms and $Z_1$, $Z_2$, and $Z_3$ represent one of the class consisting of the halogen and hydrogen atoms. The halogen group as used herein includes fluorine, chlorine, bromine and iodine, with the lower molecular weight materials being generally preferred. These compounds are crystalline solids and have been found to be reversibly photochromic. These materials as a group change color from pale yellow or yellow to orange-red or red upon irradiation with near ultraviolet (350–400 m$\mu$) electromagnetic radiation. Upon exposure of the compounds in the red state to electromagnetic radiation of longer wavelength such as present in visible light, such as about 450–600 m$\mu$, they revert to the yellow state.

Background of the invention

The novel compounds are useful for data storage elements in electronic computing devices and for data display devices. Materials exhibiting reversible photochromism meet the primary requirement for the storage of digital information: they can exist in at least two detectable states between which they can be switched by external means. Such a medium may be employed, as a matter of fact, for either storage or display provided that the material does not fatigue; i.e., become unresponsive to radiation after cycling.

In a typical system, photochromic materials of this type may be employed in relationship to an input means, and an output for the system would be disposed in viewing relationship to both the input means and the photochromic material. While with transmissive or reflective detecting techniques may be employed, these materials when prepared as film generally accommodate a reflective detecting technique in a most convenient fashion. On the other hand, however, transmission detecting techniques may be preferred in certain applications for reasons of accuracy and ease of detection.

The novel compounds may be prepared by reacting salicylaldehyde or the monohalogenated salicylaldehyde with equimolar quantities of the halogenated aniline in the presence of a solvent. In some cases the reaction takes place relatively rapidly at room temperature. In other cases, refluxing in a solvent such as methanol, fusion of the reactants, or heating of the reactants without a solvent at temperatures above 100° C. is required. The anils are then recrystallized from alcohols such as methanol or ethanol, hydrocarbons such as heptane or mixtures of solvents such as 1:3 heptane and tetrahydrofuran. These variations and exact methods of preparation are well known to those skilled in the art.

It is therefore an objective of the present invention to provide an improved photochromic compound which may be readily adapted for use as an information storage element.

It is a further objective of the present invention to provide an improved photochromic material which has two stable chromic states, and which may be reversibly driven from one stable chromic state to another.

Figure 2:
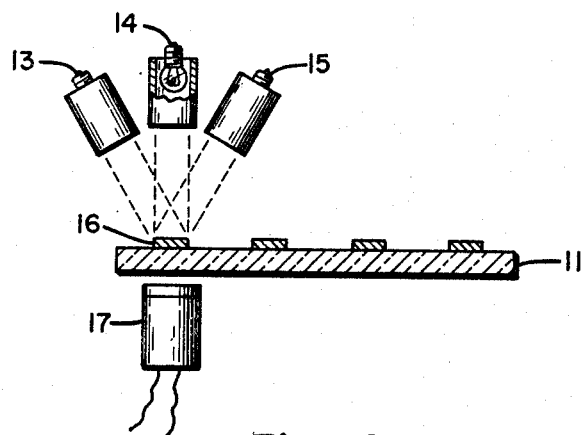

Other and further objectives of the present invention will become apparent to those skilled in the art as illustrated by the following specifications, claims and accompanying drawings in which:

FIGURE 1 is a view of an array of photochromic materials disused on the surface of a substrate; and FIGURE 2 is a schematic diagram illustrating a typical system employing an array shown in FIGURE 1.

The invention is further illustrated by the following examples:

EXAMPLE I

Preparation of salicylidene pentafluoroaniline

In a 100 ml. round bottom flask fitted wtih a reflux condenser was placed 3.7 g. (0.02 mol) of 2,3,4,5,6-pentafluoroaniline and 2.9 g. (0.024 mol) of salicylaldehyde. Ten ml. of methanol was added and the mixture was refluxed for one hour. Upon cooling a light yellow solid crystallized from solution. The crude product weighed 3.5 g. It was recrystallized from 60 ml. of heptane. Yield: 2.3 g. (40%), M.P. 140–140.5° C.

EXAMPLE II

Preparation of salicylidene 2,3,5,6-tetrafluoroaniline

In a 100 ml. beaker was placed 10 g. (0.055 mol) of 2,3,5,6-tetrafluoroaniline. 8 g. (0.066 mol) of salicylaldehyde and 25 ml. of 95% ethanol. The beaker was covered and allowed to stand ½ hour at 25° C. The pale yellow crystals which separated from solution were filtered and dried. They were recrystallized twice from 50 ml. of heptane. Yield: 6.0 g. (41%), M.P. 97–99° C.

EXAMPLE III

Preparation of salicylidene 2,4,6-trifluoroaniline

A mixture of salicylaldehyde (1.2 g., 0.01 mol) and 2,4,6-trifluoroaniline (1.4 g., 0.01 mol) was heated gently in 5 ml. of 95% ethanol and the solution was allowed to cool. After standing about one hour, light yellow crystals separated from solution. These were filtered and dried. Weight 2.2 g. The crude product was recrystallized from 25 ml. of heptane. The crystals were rinsed twice with heptane and air dried. Yield: 1.0 g. (40%), M.P. 86.5–89° C. Infrared analysis indicated that no unreacted 2,4,6-trifluoroaniline was present.

EXAMPLE IV

Preparation of salicylidene 2,6-dichloroaniline

In a 125 ml. Erlenmeyer flask was placed 1.6 g. (0.01 mol) of 2,6-dichloroaniline and 1.2 g. (0.01 mol) of salicylaldehyde. The flask was flushed with argon and the mixture was heated at 110–120° C. for ½ hour while argon was passed over the liquid at a slow rate. Fumes were evolved, and a colorless liquid condensed on the sides of the flask. The reaction mixture was allowed to cool slightly and 20 ml. of heptane was added. The mixture was heated to boiling and filtered hot. Pale yellow needles separated from solution. After a second recrystallization from heptane, needles (0.5 g., 19%) were obtained. M.P. 64–65° C. Infrared analysis indicated that the product was free of unreacted amine and aldehyde.

EXAMPLE V

Preparation of salicylidene 2,4,6-trichloroaniline

In a 100 ml. beaker was placed 11.8 g. (0.06 mol) of 2,4,6-trichloroaniline, 8.0 g. (0.066 mol) of salicylaldehyde, and 25 ml. of 95% ethanol. The solution was gently boiled ten minutes on a hot plate, filtered hot and allowed to cool. The product was recrystallized twice from 50 ml. of heptane. The lemon yellow crystals were filtered, rinsed twice with heptane and air dried. M.P. 108.5–110° C. Yield: 14 g., 78%.

EXAMPLE VI

Preparation of salicylidene pentachloroaniline

Pentachloroaniline (5.3 g., 0.02 mol) and salicylaldehyde (2.7 g., 0.022 mol) were heated at 140° C. for 4 hours. An additional 1.4 g. of salicylaldehyde was added and heating was continued an additional two hours. The dark red reaction mixture was allowed to cool. The resulting solid was recrystallized from a mixture of 40 ml. of heptane and 15 ml. of tetrahydrofuran. A brown solid was obtained. It was decolorized by refluxing five minutes in 50 ml. heptane and 15 ml. tetrahydrofuran to which a small amount of activated charcoal (Darco) had been added. The suspension was filtered hot. From the filtrate, feathery off-white crystals separated. The crystals were filtered, washed twice and dried. Yield: 1.5 g., (22%) M.P.: 167–169; the melt resolidifies and remelts at 170–170.5° C.

The mother liquor was allowed to evaporate. A yellow product was obtained infrared analysis indicated that the second crop contained a substantial amount (at least 25%) of unreacted pentachloroaniline. However, infrared analysis of the first crop indicated no unreacted pentachloroaniline was present.

EXAMPLE VII

Preparation of salicylidene 2,4,6-tribromoaniline

In a 50 ml. beaker was placed 2.7 g. (0.022 mol) of salicylaldehyde and 4.0 g. (0.012 mol) of 2,4,6-tribromoaniline. The mixture was heated on a hot plate for two hours at 140° C. The product was recrystallized three times from 40 ml. of heptane. The product obtained from the first recrystallization was brown, and a small amount of Darco was added to the second and third recrystallizations to decolorize the product. After a fourth recrystallization from 35 ml. of heptane, light yellow crystals melting at 97–99° C. were obtained. Yield: 2.0 g. (37%). Infrared analysis indicated that the purity of the sample was greater than 98%.

EXAMPLE VIII

Preparation of salicylidene 4,6-dibromo-2,5-dichloroaniline

In a 50 ml. beaker was placed 2.2 g. (0.01 mol) of 4,6-dibromo-2,5-dichloroaniline and 2.4 g. (0.02 mol) of salicylaldehyde. The mixture was heated for 3 hours at 130–140° C., another 0.6 g. (0.005 mol) of salicylaldehyde was added and the reaction mixture was heated an additional hour at 130–140° C. Finally another 2.4 g. (0.02 mol) of salicylaldehyde was added and the mixture was heated another two hours. The product was recrystallized from a mixture of 30 ml. of heptane, 10 ml. of tetrahydrofuran and a small amount of Darco. The yellow solid melted at 110–113° C. Yield: 1.2 g. (28%). After another recrystallization from methanol, the product melted at 113–114° C.

EXAMPLE IX

Preparation of 5-bromosalicylidene pentafluoroaniline

In a 50 ml. beaker was placed 2.0 g. (0.01 mol) of 4-bromosalicylaldehyde, 2.0 g. (0.01 mol) of pentafluoroaniline and 10 ml. of 95% ethanol. The mixture was gently warmed to boiling and let stand. The off-white crystals which separated from solution were filtered and dried. The crude product was recrystallized twice from 75 ml. of 95% ethanol. The pale yellow needles were filtered, rinsed twice with 95% ethanol and air dried. Yield: 2.1 g. (57%) M.P. 130.5–131.5° C.

EXAMPLE X

Preparation of 5-chlorosalicylidene pentafluoroaniline

In a 100 ml. beaker was placed 7.8 g. (0.05 mol) of 5-chlorosalicylaldehyde, 10.1 g. (0.055 mol) of pentafluoroaniline, and 30 ml. of 95% ethanol. Crystallization of the anil occurred before all the reactants had dissolved. The product was filtered off and recrystallized twice from 100 ml. of heptane. The crystals were filtered, rinsed twice with heptane and air dried. Yield: 8.5 g. (53%) M.P. 131.5–132.5° C.

EXAMPLE XI

Preparation of 5-chlorosalicylidene 2,3,5,6-tetrafluoroaniline

In a 50 ml. beaker was placed 1.7 g. (0.011 mol) of 5-chlorosalicylaldehyde, 1.7 g. (0.010 mol) of 2,3,5,6-tetrafluoroaniline and 15 ml. of 95% ethanol. The mixture was heated to boiling on a hot plate and gently boiled for five minutes. The reaction mixture was allowed to cool. The crystals which separated from solution were isolated and recrystallized twice from 40 ml. portions of heptane. The lemon yellow crystals were filtered, rinsed twice with heptane and air dried. Yield: 1.1 g. (28%) M.P. 145–147° C.

EXAMPLE XII

Preparation of 5-bromosalicylidene 2,3,5,6-tetrafluoroaniline

In a 50 ml. beaker was placed 1.7 g. (0.010 mol) of 2,3,5,6-tetrafluoroaniline and 2.2 g. (0.011 mol) of 5-bromosalicylaldehyde. The mixture was heated at 140° C. for 15 minutes. An additional 0.6 g. (0.005 mol) of 5-bromosalicylaldehyde was added and the mixture was heated an additional five minutes at 140° C. The product was recrystallized from 30 ml. of methanol and then from 40 ml. of heptane containing a small amount of Darco, and finally from heptane again. M.P. 142.5–144° C. Yield: 1.0 g., 29%.

EXAMPLE XIII

Preparation of 5-bromosalicylidene 2,4,6-trichloroaniline

In a 100 ml. beaker was placed 2.2 g. (0.011 mol) of 5-bromosalicylaldehyde and 2.0 g. (0.01 mol) of 2,4,6-trichloroaniline. The mixture was heated on a hot plate at 140° C. for 30 minutes. Upon cooling, a brownish yellow solid was obtained. It was recrystallized twice from 125 ml. of heptane. The crystals were rinsed twice with heptane and air dried. Yield: 1.0 g. (30%) M.P. 177–178.5° C.

With reference to the drawing, the array illustrated in FIGURE 1 and shown generally at 10 includes a substrate 11 having a plurality of discrete areas of polyhalogenated salicylidene aniline film 12 disposed on the surface thereof. Preferably, the substrate material is comprised of quartz, and the discrete areas may, for example, be chlorosalicylidene pentafluoroaniline. With regard to the system shown in FIGURE 2, the information storage means 10 is disposed between a plurality of radiant energy sources.

In a practical embodiment, the information retaining member 10 is disposed between a plurality or radiant energy sources 13, 14, and 15, each of which is focused upon the specific discrete area 16, with a sensor element 17 being disposed on the opposite side of the element and in viewing relationship to the energy sources. The source 13 is capable of emitting radiation in the ultraviolet range such as in the range of about 390 millimicrons, this being useful for "writing" into the discrete area of bistable photochromic material 16 by continuing the exposure until the material in the discrete area 16 is converted to the red state. For converting the yellow form to the red form, radiation in the range of from about 350 millimicrons to about 410 millimicrons may be utilized, the optimum range being from between about 385 millimicrons up to about 390 millimicrons. The radiation source 14 is adapted for use as a reading or interrogating source and preferably emits short pulses of radiation in the range of about 480 millimicrons, these pulses of radiation being sensed by the sensor 17 for interrogating the material, radiation is utilized having a spectral range which substantially coincides with that certain spectral range wherein a maximum difference exists between the transmission curves of the various forms being sensed or observed. Radiation source 15 emits radiation in the range of 500 millimicrons at an intensity sufficient to convert the discrete area of photochromic substance 16 to the yellow state, the energy of the source being sufficient to convert or restore the sensitive area to this state in a short interval of time. The sensor 17 is sensitive to the level or degree at which radiation is transmitted by the photochromic material 16 while in one or the other of its stable states, and can thereby discriminate between the state of the photochromic material. Thus, the sensor is capable of detecting the quantity or intensity of radiation which is transmitted from the interrogating source by the photochromic material. The sensor 17 may thereby provide an indication of the specific bistable state of the discrete area of photochromic material 16, and this indication of state may be, of course, translated into a "0" or "1" binary state for data processing applications. If desired, the radiation source 14 which functions as an interrogation radiation source may serve a dual function of the interrogating radiation source 14 and the writing radiation source 15. Also, if desired, the various radiation sources may be provided with filters, as required, to bring the radiation spectrum into accord with the requirements of the sensitive photochromic material and also the requirement of the sensor 17.

It is understood that suitable modifications may be made in the structure as disclosed. Having now, therefore, fully illustrated and described my invention, what I claim to be new and desire to protect by Letters Patent is:

1. The polyhalogenated salicylidene aniline having the formula

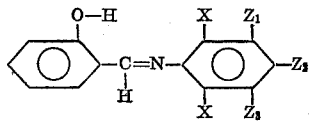

wherein X represents a halogen atom and $Z_1$, $Z_2$, and $Z_3$ are members selected from the group consisting of halogen and hydrogen atoms.

2. The compound as defined in claim 1 wherein X, $Z_1$, $Z_2$, and $Z_3$ represent fluorine atoms.

3. The compound as defined in claim 1 wherein X, $Z_1$, $Z_2$, and $Z_3$ represent chlorine atoms.

4. The compound as defined in claim 1 wherein X, $Z_1$, and $Z_3$ represent fluorine atoms and $Z_2$ represents a hydrogen atom.

5. The compound as defined in claim 1 wherein X and $Z_2$ represent bromine atoms and $Z_1$ and $Z_3$ represent hydrogen atoms.

6. The compound as defined in claim 1 wherein X and $Z_2$ represent chlorine atoms and $Z_1$ and $Z_3$ represent hydrogen atoms.

7. The compound as defined in claim 1 wherein X and $Z_2$ represent fluorine atoms and $Z_1$ and $Z_3$ represent hydrogen atoms.

8. The compound as defined in claim 1 wherein X represents a chlorine atom and $Z_1$, $Z_2$, and $Z_3$ represent hydrogen atoms.

9. The compound as defined in claim 1 wherein X is selected from the group consisting of chlorine and bromine and wherein $Z_1$ represents hydrogen, $Z_2$ represents bromine and $Z_3$ represents chlorine.

10. The polyhalogenated salicylidene aniline having the formula

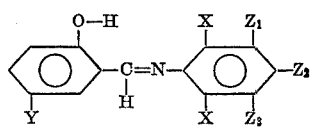

wherein X and Y represent halogen atoms and $Z_1$, $Z_2$ and $Z_3$ represent a material selected from the group consisting of a halogen atom and a hydrogen atom.

11. The compound as defined in claim 10 wherein Y represents a bromine atom and X, $Z_1$, $Z_2$, and $Z_3$ represent fluorine atoms.

12. The compound as defined in claim 10 wherein Y represents a chlorine atom and X, $Z_1$, $Z_2$, and $Z_3$ represent fluorine atoms.

13. The compound as defined in claim 10 wherein Y represents a bromine atom, X, $Z_1$, and $Z_3$ represent a fluorine atom, and $Z_2$ represents a hydrogen atom.

14. The compound as defined in claim 10 wherein Y represents a chlorine atom and X, $Z_1$, and $Z_3$ represent a fluorine atom, and $Z_2$ represents a hydrogen atom.

References Cited

UNITED STATES PATENTS

| | | | |
|---|---|---|---|
| 2,847,472 | 8/1958 | Robertson | 260—566 |
| 3,012,068 | 12/1961 | Shulgin | 260—482 |
| 3,253,022 | 5/1966 | Linder et al. | 260—566 XR |

ROBERT V. HINES, Primary Examiner

U.S. Cl. X.R.

260—578; 340—173